(12) United States Patent
Rascagneres et al.

(10) Patent No.: US 12,492,317 B2
(45) Date of Patent: Dec. 9, 2025

(54) OPAQUE GREY INK JET INK COMPOSITION

(71) Applicant: DOVER EUROPE SARL, Vernier (CH)

(72) Inventors: Stéphanie Rascagneres, Guilherand Granges (FR); Grégory Guillot Patrique, Vinay (FR)

(73) Assignee: DOVER EUROPE SARL, Vernier (CH)

( * ) Notice: Subject to any disclaimer, the term of this patent is extended or adjusted under 35 U.S.C. 154(b) by 460 days.

(21) Appl. No.: 17/999,816

(22) PCT Filed: May 27, 2021

(86) PCT No.: PCT/EP2021/064251
§ 371 (c)(1),
(2) Date: Nov. 23, 2022

(87) PCT Pub. No.: WO2021/239902
PCT Pub. Date: Dec. 2, 2021

(65) Prior Publication Data
US 2023/0203327 A1 Jun. 29, 2023

(30) Foreign Application Priority Data
May 29, 2020 (EP) .................... 20177474

(51) Int. Cl.
*C09D 11/322* (2014.01)
*B41J 2/01* (2006.01)
(Continued)

(52) U.S. Cl.
CPC ............... *C09D 11/322* (2013.01); *B41J 2/01* (2013.01); *B41J 2/2107* (2013.01); *B41M 5/0041* (2013.01); *C09D 11/033* (2013.01); *C09D 11/037* (2013.01); *C09D 11/108* (2013.01); *C09D 11/32* (2013.01); *C09D 11/326* (2013.01); *C09D 11/328* (2013.01); *C09D 11/36* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/326; C09D 11/107; C09D 11/03; C09D 11/037; C09D 11/033; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS 4,056,402 A * 11/1977 Guzi, Jr. .............. C09D 101/26
106/190.1
4,180,407 A 12/1979 Gibson et al.
(Continued)

FOREIGN PATENT DOCUMENTS

| CN | 103923516 A * | 7/2014 | ................ B41J 2/01 |
| WO | 2008055030 A1 | 5/2008 | |
| WO | 2017025442 A1 | 2/2017 | |

OTHER PUBLICATIONS

International Search Report for PCT/EP2021/064251 dated Sep. 2, 2021.
Written Opinion for PCT/EP2021/064251 dated Sep. 2, 2021.

*Primary Examiner* — Manish S Shah
(74) *Attorney, Agent, or Firm* — McDonald Hopkins LLC

(57) ABSTRACT

Opaque grey ink jet ink composition, comprising: a solvent comprising one or more organic solvent compound(s); b) a binder, comprising one or more binding resin(s); wherein the ink jet ink composition further comprises: one or more black pigment(s) and/or one or more black dye(s); one or more white pigment(s); wherein the one or more black pigment(s) and/or the one or more black dye(s) is(are) present in a total amount from 0.01% to 9% by weight, of the total weight of the ink jet ink composition; wherein the one or more white pigment(s) is(are) present in a total amount from 0.5% to 30% by weight, of the total weight of the ink jet ink composition; and wherein the ratio: amount by weight of the one or more black pigment(s) and/or the one or more black dye(s)/amount by weight of the one or more white pigment(s) is from 0.001 to 1.

19 Claims, 1 Drawing Sheet

(51) Int. Cl.
*B41J 2/21* (2006.01)
*B41M 5/00* (2006.01)
*C09D 11/033* (2014.01)
*C09D 11/037* (2014.01)
*C09D 11/108* (2014.01)
*C09D 11/32* (2014.01)
*C09D 11/326* (2014.01)
*C09D 11/328* (2014.01)
*C09D 11/36* (2014.01)
*C09D 11/38* (2014.01)

(56) References Cited

U.S. PATENT DOCUMENTS

| | | | | |
|---|---|---|---|---|
| 2003/0056687 | A1* | 3/2003 | Sano | C09D 11/324 |
| | | | | 106/31.9 |
| 2004/0216638 | A1* | 11/2004 | Rolly | B41J 2/2114 |
| | | | | 106/31.86 |
| 2007/0048407 | A1* | 3/2007 | Collins | A23G 3/0097 |
| | | | | 426/87 |
| 2010/0247797 | A1* | 9/2010 | Umebayashi | C09D 11/101 |
| | | | | 522/39 |
| 2013/0236660 | A1* | 9/2013 | Niu | C09D 11/101 |
| | | | | 156/244.11 |
| 2022/0356360 | A1* | 11/2022 | Tehrani | C09D 11/322 |

* cited by examiner

OPAQUE GREY INK JET INK COMPOSITION

CROSS-REFERENCE TO RELATED APPLICATIONS

This is a National Stage application of PCT international application PCT/EP2021/064251, filed on May 27, 2021, which claims the priority of French Patent Application No. 20177474.2, filed May 29, 2020, both of which are incorporated herein by reference in their entirety.

TECHNICAL FIELD

The invention relates to an opaque grey ink composition giving printed messages, markings, having good contrast, good legibility, good visibility on all kinds of coloured surfaces, whatever the colour thereof.

In particular, the printed messages have good contrast, good legibility, good visibility both on black surfaces and on white surfaces, i.e. the two extremes on the colorimetric scale, and therefore they also have good contrast, good legibility, good visibility on all surfaces having colours intermediate between these two extremes such as dark coloured surfaces and light coloured surfaces.

In other words, according to the invention, a same and single opaque grey ink composition provides printed messages having good contrast, good legibility, and good visibility, both on dark coloured surfaces e.g. black surfaces and on light coloured substrates e.g. white substrates.

The properties of the ink composition according to the invention are particularly suitable for ink jet marking or printing on a very wide variety of supports, substrates and objects, and particularly on flexible supports, substrates and objects.

The ink composition according to the invention is especially suitable for marking, printing with the deflected continuous ink jet printing technique (CIJ).

The ink composition according to the invention is notably suitable for marking substrates, supports, and objects made of organic polymers, in particular made of thermoplastic polymers («plastic materials»), such as polyolefins like polyethylenes (PE) or polypropylenes (PP), or polyvinylchlorides (PVC), or made of metals such as aluminum or metal alloys such as steel, or made of rubber.

The ink composition according to the invention is particularly suitable for marking extruded, moulded, blow-moulded, injection-moulded, and rotation-moulded parts made of organic polymers, in particular made of thermoplastic polymers, notably made of polyvinylchlorides (PVCs), or of polyolefins, such as polyethylenes (PEs) or polypropylenes (PPs); or made of rubber.

Such parts are, for example, wires, cables, hoses, pipes, cable ducts, cable trays, and boxes, coatings and housings of all kinds such as electrical boxes and cable boxes.

The ink composition according to the invention is an opaque ink composition as defined below.

The ink composition according to the invention is also a grey ink composition as defined below.

State of the Prior Art

Ink jet printing is a well-known technique which allows printing, marking or decorating of all kinds of objects, at high speed and without contact of these objects with the printing device, with messages which can be changed at will such as bar codes, sell-by dates etc., even on non-planar supports.

Ink jet printing, spraying techniques are divided into two major types, namely the technique known as Drop On Demand or DOD technique, and the technique known as Continuous Ink Jet (CIJ) technique.

Jetting using the drop on demand technique may be done using a so-called "bubble" ink jet, a "piezoelectric" ink jet, a "valve" ink jet, or finally a so-called "Hot Melt" (HM) or phase change ink jet.

In the case of bubble ink jet, ink is vaporised close to the nozzle and this vaporisation causes the ejection of a small quantity of ink located between the resistor that vaporises the ink and the nozzle. In the case of a piezoelectric ink jet, a sudden pressure variation caused by an actuator moved by the electrical excitation of a crystal or a piezoelectric ceramic located close to the nozzle, causes the ejection of an ink drop.

In the case of the "Hot Melt" ink jet, the ink is solvent free and is heated to above its melting point.

"Drop On Demand" printing may therefore be carried out at ambient, room, temperature, this is the case of the piezoelectric ink jet, of the valve ink jet, or of the bubble ink jet, or at high temperature, for example from about 60° C. to 130° C., this is the case of the so-called Hot Melt (HM) or phase change ink jet.

Continuous deflected ink jet spraying consists in sending ink under pressure into a cavity containing a piezoelectric crystal, from which ink escapes through an orifice (nozzle) in the form of a jet.

The piezoelectric crystal, vibrating at a determined frequency, provokes pressure disturbances in the ink jet, which oscillates and gradually breaks up into spherical droplets. An electrode called the "charging electrode" placed on the path of the jet at the location at which it breaks, imparts an electrostatic charge to these droplets, if the ink is conductive. The droplets thus charged are deflected, deviated in an electric field to enable printing.

Uncharged drops that are therefore not deflected or deviated are recovered in a gutter from which ink is sucked up, drawn, and then recycled to the ink circuit.

For all ink jet printing techniques and technologies, including the binary continuous deviated, deflected, liquid jet printing technique with uncharged drops called the "SPI" technique, the viscosity of inks at the ink projection temperature is very low, typically from 1 to 10 cPs (mPa·s), or 15 cPs, or 20 cPs, and therefore all these printing techniques that make use of ink jetting, spraying, can be described as low viscosity ink deposition technologies.

Ink jetting, projection, spraying, enables contactless marking at a high running rate on objects that are not necessarily planer with the possibility of changing the message at will.

Ink compositions that can be sprayed, jetted, particularly in the continuous deflected, inkjet printing technique have to satisfy a number of criteria inherent to this technique related to (among other factors) the viscosity, solubility in a solvent for cleaning, compatibility of ingredients, proper wetting of supports to be marked, etc., and electric conductivity in the case of the continuous deflected, deviated, continuous inkjet printing technique.

Furthermore, these inks must dry quickly, be capable of flowing or remaining motionless close to the nozzle without clogging it, with good stability of the jet orientation to enable easy cleaning of the printing head.

Ingredients of inks currently used in the continuous deflected, deviated, ink jet printing technique, are organic or inorganic, mineral products; they are colouring materials such as dyes or pigments, resins or binders, in one or several more or less volatile organic solvent compound(s) or in water, optionally one or several salt(s) imparting conductivity (commonly called conductivity salts), as well as various additives, such as surface tension modifiers, surface active agents such as polyether modified polysiloxane.

Ingredients used in the composition of currently used inks for the drop on demand (DOD) type ink jet printing technique are also organic or inorganic, mineral products; dyes or pigments, resins or binders, in one or several more or less volatile organic solvent compound(s) or in water, in proportions other than those used for inks for the continuous deflected, deviated ink jet printing technique, but without the need for electrical conductivity.

In the case of inks for the "Hot Melt" (HM) ink jet printing technique, the inks do not contain any solvents liquid at ambient temperature, but they rather contain liquid organic products at the jetting, spraying, projection, temperature mentioned above, such as waxes and resins of low molecular weight. These waxes and resins of low molecular weight are generally chosen such that the viscosity of the ink at the jetting, spraying, projection temperature is from 2 to 25 mPa·s.

The solvent of inks for ink jet printing, except for inks for Hot Melt ink jet printing, is usually composed of a mixture comprising firstly a majority quantity of volatile solvent compounds with low viscosity, to enable very fast drying of the markings, and to adjust the viscosity to the required value, for example from 1 to 10 cPs (mPa·s), or 15 cPs, or 20 cPs, and secondly solvent compounds with a higher viscosity and less volatile, that dry more slowly and are in lower quantities, to prevent the ink from drying in the nozzle during phases in which the printer is switched off.

The most frequently used volatile solvent compounds are alcohols, ketones or esters with low molecular weight.

Among these solvent compounds, essentially methanol, ethanol, 1- and 2-propanol, acetone, methyl-ethyl ketone ("MEK"), methyl isobutyl ketone, ethyl acetate, and tetrahydrofuran may be cited.

Less volatile solvent compounds that in particular have a drying retarder function are most frequently ketones such as cyclohexanone, glycol ethers, ethers and acetals, such as furan or dioxan, dimethyl formamide or dimethylsulphoxide, lactones, N-Methyl Pyrrolidone, glycols, and even aliphatic hydrocarbons or water, alone or in combination with other solvent compounds mentioned above.

Additives Include:
  Plasticizers that make the dry ink film more flexible, in other words that soften the dry ink film, to improve adherence and cohesion of the ink on the marked support.
  Dispersants that disperse the pigments. Such dispersants stabilise the pigments by steric effect and/or electrostatic effect depending on whether they can be ionised or not and depending on the polarity of the solvent.
  Agents that inhibit corrosion induced by some salts, such as salts that confer conductivity (called conductivity salts) described below such as chlorides.
  Additives that protect the ink against proliferation of bacteria and other micro-organisms: these include biocides, bactericides, fungicides and others, particularly useful in inks containing water.
  Surface tension modifiers, surface active agents such as polyether modified polysiloxanes.
  pH regulation buffers.
  Anti-foaming agents.

Inks for ink jet printing may also include surfactants or surface active agents that modify the wetting or penetrating capacity of the ink, in particular surfactants or surface active agents that modify or regulate the static or dynamic surface tension such as Fluorad® FC 430 made by the 3M Company. Such products regularise the size of drop impacts. Due to these products, the impact diameter is the same for all drops regardless of the nature, cleanliness or regularity of the support.

Additives for inks for the continuous deviated, deflected, ink jet printing technique may also include one or several salts called conductivity salts.

The conductivity salt(s), if any, provide the ink with the conductivity necessary for electrostatic deviation, deflection.

However, it can be noted that in some cases, other ink constituents such as dyes or pigments already confer enough conductivity to the ink so that there is no need to add a conductivity salt.

Binder(s) or resin(s) is (are) generally, mostly, one or more solid polymeric compound(s) and their choice depends on their solubility in the selected solvents, their compatibility with the dyes and the other additives, their ability to give the right electrostatic charge to the drops, and also depending on the properties that they confer on the ink film once it is dried.

Their primary function is to provide adherence for the ink on a maximum number of supports or on special supports, for example non-porous supports. They also confer appropriate viscosity to the ink for the formation of drops from the jet and they provide the marking obtained with most of its properties of resistance to physical and/or chemical aggression such as resistance to friction and more generally to abrasion.

The polymers used with organic solvents may be synthetic or natural, they may be linear polymers such as rosin resins, shellac, resins of the acrylic, methacrylic, styrenic, vinylic, cellulosic, and phenolic types, polyamides, polyurethanes, melamines, or polyesters; or branched polymers such as dendrimers.

Colouring materials are called "dyes or pigments" depending on whether they are soluble or insoluble, respectively, in the solvent used.

Pigments are inherently insoluble and are therefore dispersed and may or may not be opaque. They impart its colour to the ink, its opaqueness, or particular optical properties such as fluorescence. In some cases, dyes also confer sufficient conductivity to the ink so that there is no need to add a conductivity salt. This is the case of dyes known under the name C.I. Solvent Black 27, 29, 35 and 45.

Ink jet ink composition should give printed messages, markings, having good contrast, good legibility, and good visibility on the surfaces to be printed. Contrast, legibility, and visibility are dependent on the colour and on the opaqueness of the ink composition, and on the colour of the surface to be printed.

Thus, the colouring material included in the ink composition is specifically selected depending on the specific colour and lightness of the surface to be printed, marked, so as to impart to the ink composition, and hence to the printed message, marking, a colour, a lightness, and an opaqueness providing good contrast with the colour of the surface to be printed, marked, and therefore good legibility.

Each ink composition contains therefore a specific colouring material, and is specifically tailored for printing, marking surfaces having the same specific colour and does not allow for printing of surfaces having other colours.

A different, specific ink, containing a specific colouring material should therefore be used for each surface to be printed, each having a different, specific, colour.

This is especially detrimental, when surfaces to be printed having different colours and lightness, are present on the same substrate such as a wire, pipe, hose, or cable.

In the light of the above, there is a need for obtaining printed messages, markings, having good contrast, good legibility, and good visibility, on all kinds of coloured surfaces, whatever the colour and lightness thereof, by using a one and single ink composition.

In particular, the printed messages should have good contrast, good legibility, good visibility, both on black surfaces and on white surfaces, i.e. the two extremes on the colorimetric scale, so that they also have good contrast, good legibility, good visibility, on all surfaces having colours intermediate between these two extremes such as dark coloured surfaces and light coloured surfaces.

There is also a need for an ink jet ink composition achieving overall a high printing quality. For example, the markings obtained with such an ink jet ink composition should not spread especially on polymer substrates.

The ink should not smudge, especially on polymer substrates, such as PP, PE, and PVC substrates.

The adhesion of the markings to the printed substrate should be high.

In other words, apart from the needs already specified above in relation with good contrast, good legibility, good visibility, of the printed messages, markings, there is a need for an ink jet ink composition that can be projected by all ink jet technologies such as the CIJ and the DOD techniques, and which enables the marking of all substrates, such cables and wires, made of all kinds of material such as polymers (PVC, PP, PE), metals (steel, aluminium), at ambient temperature.

This ink composition must, further, have all the properties normally required of inks for ink jet printers, for example for inks for printers using the continuous deflected ink jet technique: viscosity, resistivity, etc. The ink must have at the same time the property of drying quickly, to not obstruct the nozzles and to enable a rapid start up even after a long stoppage.

The ink composition must, in addition, enable marking at high speed of objects of all kinds, even slightly porous, while always giving printing or marking of excellent quality, definition, and regularities.

In other words, there is, overall, a need for an ink jet ink composition giving printed messages, markings having good contrast, good legibility, good visibility, on all kinds of coloured surfaces whatever the colour and lightness thereof; having high marking and printer performances;

being stable and having suitable physicochemical properties, such as viscosity and conductivity for use in ink jet printers.

The goal of the invention is to provide an ink composition for ink jet printing that meets among other things the needs and requirements listed above.

The goal of the invention is also to provide an ink composition for ink jet printing that does not have the drawbacks, defects, limitations and disadvantages of the ink compositions of the prior art and which provides a solution to the problems of the compositions of the prior art.

SUMMARY OF THE INVENTION

This goal and still other ones are achieved, according to the invention, by an opaque grey ink jet ink composition (i.e. an opaque grey ink composition for ink jet printing), liquid at room temperature, comprising:
a) a solvent comprising one or more organic solvent compound(s);
b) a binder, comprising one or more binding resin(s);
wherein the ink jet ink composition further comprises:
c) one or more black pigment(s) and/or one or more black dye(s);
d) one or more white pigment(s);
wherein the one or more black pigment(s) and/or the one or more black dye(s) c) is(are) present in a total amount from 0.01% to 9% by weight, preferably from 0.01% to 8.5% by weight, more preferably from 0.01% to 5% by weight, even more preferably from 0.05% to 4.5% by weight, better from 0.08% to 4.5% by weight, still better from 0.1% to 2.55% by weight of the total weight of the ink jet ink composition;
wherein the one or more white pigment(s) is(are) present in a total amount from 0.5% to 30% by weight, preferably from 1% to 15% by weight, more preferably from 2% to 10% by weight, better from 3% to 9% by weight of the total weight of the ink jet ink composition; and
wherein the ratio: amount by weight of the one or more black pigment(s) and/or the one or more black dye(s)/amount by weight of the one or more white pigment(s) is from 0.001 to 1, preferably from 0.001 to 0.5, more preferably from 0.001 to 0.3, better from 0.005 to 0.3, still better from 0.01 to 0.3, especially from 0.01 to 0.1, more especially from 0.01 to 0.05, even more especially from 0.02 to 0.05.

In a first embodiment, the opaque grey ink jet ink composition according to the invention comprises one or more black pigments and no black dyes, and said black pigment(s) is(are)present in a total amount from 0.01% to 5% by weight, preferably from 0.08% to 4.5% by weight, more preferably from 0.1% to 2.55% by weight of the total weight of the ink jet ink composition; and the ratio: amount by weight of the one or more black pigment(s)/amount by weight of the one or more white pigment(s) is from 0.001 to 0.3, preferably from 0.01 to 0.3, more preferably from 0.01 to 0.1, better from 0.01 to 0.05, still better from 0.02 to 0.05.

In a second embodiment the opaque grey ink jet ink composition according to claim 1 comprises one or more black dye(s) and no black pigments, and said black dye(s) is(are)present in a total amount from 0.01% to 9% by weight, preferably from 0.01% to 8.5% by weight, more preferably from 0.01% to 5% by weight, even more preferably from 0.05% to 4.5% by weight, of the total weight of the ink jet ink composition; and the ratio: amount by weight of the one or more black dye(s)/amount by weight of the one or more white pigment(s) is from 0.001 to 1, preferably from 0.001 to 0.5, more preferably from 0.001 to 0.3, better from 0.005 to 0.3, still better from 0.01 to 0.3, especially from 0.01 to 0.1, more especially from 0.01 to 0.05, even more especially from 0.02 to 0.05.

Ink jet printing includes the continuous, deflected, deviated, ink jet ("CIJ") printing technique and the Drop-On-Demand ("DOD") ink jet printing technique.

The continuous, deflected, deviated, ink jet printing technique also includes the binary deviated continuous ink jet printing technique with uncharged drops called the "SPI" technique.

By «room temperature» is generally meant a temperature from 5° C. to 30° C., preferably from 10° C. to 25° C., still preferably from 15° C. to 24° C., better from 20° C. to 23° C. It is quite understood that the ink is liquid at atmospheric pressure.

The term "pigment" refers to a colorant that is generally insoluble in water and in organic solvents, especially in the solvent of the ink composition according to the invention and is solid at ambient temperatures.

The term "dye" refers to a colorant that is generally soluble in water or in organic solvents, especially in the solvent of the ink composition according to the invention.

The ink composition according to the invention has never been described, nor suggested in the prior art.

The ink composition according to the invention is an opaque ink jet ink composition.

By opaque ink composition is generally meant an ink composition giving on a substrate, support, or background, markings, printed messages, through which the colour of the substrate, support, or background, cannot be seen any more.

This is especially true when the particle size of the pigments of the ink composition is sufficiently large compared to the wavelength of visible light, and when the refraction index of said pigments is sufficiently different from the refraction index of the medium where they are dispersed.

$\Delta L\_*n$ (see below) of an opaque ink composition is generally greater than 10.

$\Delta L\_*n$ (see below) is the colour difference between $L*n$, i.e. $L*$ of the dried ink composition coated on a black support, substrate, or background, such as the black strip of an opacity chart, and $L*ref$, i.e. $L*$ (average) of the black support, substrate, or background, such as the black strip (i.e. black background) of the opacity chart.

The ink jet ink composition according to the invention is also a grey ink jet ink composition, i.e. an ink jet ink composition which is of a grey colour.

The markings, printed messages obtained with the grey ink jet ink composition according to the invention are also of a grey colour.

Grey is generally defined as a colour intermediate between black and white.

Generally, $a*$, and $b*$ of a grey ink composition and of the dried coated grey ink composition measured in CIELAB coordinates, CIELAB colour space (also known as CIE $L*a*b*$) are low, i.e. less than 10 in absolute value.

And $L*$ of a grey ink composition and of the dried coated grey ink composition measured in CIELAB coordinates, CIELAB colour space (also known as CIE $L*a*b*$) is between 0 (not included) and 100 (not included) and preferably from 0 (not included) to 80.

The ink jet ink composition according to the invention comprises a combination of:
one or more black pigment(s) and/or one or more black dye(s) on the one hand; and of
one or more white pigment(s) on the other hand.

According to a first fundamental, essential, feature of the ink jet ink composition according to the invention, the one or more black pigment(s) and/or the one or more black dye(s) c) is (are) present in a specific amount, namely a total amount from 0.01% to 9% by weight, preferably from 0.01% to 8.5% by weight, more preferably from 0.01% to 5% by weight, even more preferably from 0.05% to 4.5% by weight, better from 0.08% to 4.5% by weight, still better from 0.1% to 2.55% by weight of the total weight of the ink jet ink composition.

According to a second fundamental, essential, feature of the ink jet ink composition according to the invention, the one or more white pigment(s) d) is (are) present in a specific amount, namely a total amount from 0.5% to 30% by weight, preferably from 1% to 15% by weight, more preferably from 2% to 10% by weight, better from 3% to 9% by weight of the total weight of the ink jet ink composition.

According to a third fundamental, essential feature of the ink jet ink composition according to the invention, the ratio: amount by weight of the one or more black pigment(s) and/or the one or more black dye(s)/amount by weight of the one or more white pigment(s) is from 0.001 to 1, preferably from 0.001 to 0.5, more preferably from 0.001 to 0.3, better from 0.005 to 0.3, still better from 0.01 to 0.3, especially from 0.01 to 0.1, more especially from 0.01 to 0.05, even more especially from 0.02 to 0.05.

An opaque grey ink jet ink composition comprising a combination of one or more black pigment(s) and/or one or more black dye(s); and of one or more white pigment(s) and having both first, second, and third fundamental, essential features has not been disclosed or suggested in the prior art.

It has been actually demonstrated (see examples) that due to said specific amount, within a specific range, of black pigment(s) and/or black dye(s) c), said specific amount, within a specific range, of white pigment(s) d), and said specific ratio, within a specific range, the ink jet composition according to the invention, gives printed messages, markings of a grey colour having good contrast, good legibility, good visibility, both on black surfaces and on white surfaces, i.e. the two extremes on the colorimetric scale, thus also having good contrast, good legibility, good visibility, on all surfaces having colours intermediate between these two extremes such as dark coloured surfaces and light coloured surfaces.

The ink jet ink composition according to the invention may therefore be defined as an "universal" opaque grey ink jet ink composition since it gives readable, legible, visible markings on all coloured surfaces whatever the colour and lightness thereof.

In other words, because of said specific amount of black pigment(s) and/or black dye(s) c) and said specific ratio easy reading of printed messages, markings obtained using the ink composition according to the invention are possible both on black surfaces and on white surfaces, i.e. the two extremes on the colorimetric scale, thus also on all surfaces having colours intermediate between these two extremes such as dark coloured surfaces and light coloured surfaces.

The ink jet ink composition according to the invention appears substantially grey both when printed on a white surface or a black surface, meaning that markings obtained using the ink jet ink composition according to the invention are visually, visibly, vividly distinguishable from both a white and a black background and do not mix with these backgrounds.

Contrast, legibility, and visibility, of printed messages, markings obtained with the ink jet ink compositions according to the invention have been assessed with the naked eyes by several observers, i.e. a panel of observers, and have proved to be good (see examples).

Contrast, legibility, and visibility, of printed messages, markings obtained with the ink jet ink compositions according to the invention have also been assessed by measuring $\Delta L\_*n$ and $\Delta L\_*b$ of ink jet compositions according to the invention handcoated on contrast cards and allowed to dry in air at room temperature.

A detailed explanation of how ΔL*n and ΔL*b are defined, measured and calculated is provided herein below in the "examples" section of the description.

ΔL*n may be at least 10, preferably at least 12, more preferably at least 30.

ΔL*b may be at least 15, preferably at least 20, more preferably at least 25.

A preferred ΔL*n range is from 10 to 50, preferably from 12 to 44, more preferably from 30 to 45, for example 40.

A preferred ΔL*b range is from 15 to 80, preferably from 32 to 79, more preferably from 30 to 50, for example 40.

ΔL*n and ΔL*b are corresponding to contrast measurements. The visibility of the marking is lower when either ΔL*n or ΔL*b is low, whether on black, dark or white or light substrates, and the visibility of the marking is higher when ΔL*n and ΔL*b are high.

When ΔL*n and ΔL*b are close to each other (namely do not differ from more than 15, preferably more than 10, more preferably more than 5), visibility of the marking is optimal both on a white background, support, and on a black background. The optimal values of ΔL_*n and ΔL_*b are both close to 40.

The limit values of the ΔL_*n and ΔL_*b preferred ranges mentioned above are limit values derived from experimentally measured value of printed messages, markings obtained with the ink jet ink compositions according to the invention (dried in air at room temperature) which were considered as visible, legible, by a panel of observers. The ink composition according to the invention inter alia meets the needs, criteria and requirements mentioned above and provides a solution to the problems of the ink jet ink compositions of the prior art and does have the drawbacks, limitations, defects and disadvantages of the inkjet ink compositions of the prior art.

In particular, in addition to providing markings which are legible, visible, and have good contrast on all coloured surfaces the ink jet compositions according to the invention provide markings that resist to friction, rubbing, for example with a finger and with a gum, and are not damaged or erased (see examples).

The printing quality is high and the markings visually appear as distinct, well separated, round dots (or droplets), which do not merge with each other and the printed message is clear and easily legible (see examples).

In other words, the marking dots exhibit a high definition and do not smear or smudge (see examples).

The markings obtained with the opaque grey ink jet ink compositions according to the invention are also highly resistant to water, organic solvents, alcohols, oils, and greasy substances, for example to water, ethanol, isopropanol, and gasoline. Said markings are also resistant to rubbing with said substances (see examples).

Markings obtained with the ink compositions according to the invention do not transfer (see examples).

Markings obtained with the ink composition according to the invention also give good results when subjected to the "Scotch Tape" test (se examples).

The opaque grey ink jet ink compositions according to the invention have a high lightfastness.

The ink compositions according to the invention are also stable upon storage even during long period of time, generally of at least 9 months, between 0° C. and 50° C.

The black pigment(s) may be selected from all known black pigments, such as carbon blacks.

The black pigment(s) may preferably be selected among C.I. (Colour Index) Pigment Blacks, such as C.I. Pigment Black 6 (carbon black) and C.I. Pigment Black 7 (carbon black).

The black dye(s) may be selected from all known black dyes.

The black dye(s) may preferably be selected among C.I. (Colour Index) Solvent Blacks, such as C.I. Solvent Black 27, C.I. Solvent Black 29, C.I. Solvent Black 35, and C.I. Solvent Black 45.

Solvent Black 27 is preferred. It has been shown that Solvent Black 27 is perfectly compatible with the other components of the ink composition, especially with the white pigments such as titanium dioxides ($TiO_2$).

An example of a black dye (Solvent Black 27) is Savinyl® Black RLSN01, a solvent soluble metal complex dye.

Solvent Black 27 is also available from Orient Chemical Industries Co. Ltd under the denomination VALIFAST® Black 3830.

The white pigment(s) may be selected from all known white pigments such as titanium dioxides ($TiO_2$) especially in rutile form.

The white pigment(s) may preferably be selected among C.I. (Colour Index) Pigment Whites, such as C.I. Pigment White 5 (Lithopone, mixture of barium sulphate and zinc sulphide), 6 ($TiO_2$), 12 ($ZrO_2$), and 21 ($BaSO_4$).

C.I. Pigment White 6 ($TiO_2$) is particularly preferred. The opaque grey ink jet ink composition according to the invention may further comprise one or more dye(s) and/or one or more pigment(s) having a colour other than white and other than black.

Said colour other than white and other than black may be any colour such as red, orange, yellow, green, blue, violet, and purple.

Said one or more dye(s) and/or one or more pigment(s) having a colour other than white and other than black are chosen depending on the colour of the substrate, support to be printed.

The one or more dye(s) and/or the one or more pigment(s) having a colour other than white and other than black may be present in a total amount from 0.01% to 1.5%, preferably from 0.01% to 0.9%, still preferably from 0.05% to 0.2% by weight of the total weight of the ink jet ink composition.

The one or more dye(s) having a colour other than white and other than black may be selected from among Colour Index (C.I.) solvent dyes, and the one or more pigment(s) having a colour other than white and other than black may be selected from among Colour Index (C.I.) pigments.

Said Colour Index (C.I.) solvent dyes may be chosen from among metal complex dyes. Such dyes dissolve well in the organic solvents of the ink jet ink composition.

The Colour Index (C.I.) solvent dyes having a colour other than white and other than black may preferably be selected from among yellow, orange, red, violet, purple, blue, green, and brown C.I. solvent dyes.

The Colour Index (C.I.) pigments having a colour other than white and other than black may preferably be selected from among yellow, orange, red, violet, purple, blue, green and brown C.I. pigments.

As an example, C.I. Pigment Yellow 83 improves ink readability on blue substrates.

Advantageously, the binding resin(s) may be selected from (meth)acrylic, vinylic, ketonic, hydroxyaromatic for example phenolic, cellulosic, styrenic, epoxy, polyurethane, styrene-acrylate, alkoxysilane, ester resins, and combinations thereof.

Preferably, the binding resin(s) is (are) selected from cellulosic, polyurethane, vinylic, phenolic, (meth) acrylic resins, and the combinations of two or more of the latter.

Preferably, the binding resin(s) is(are) selected from vinyl acetate/vinyl chloride copolymers, phenolic resins, cellulosic resins, and (meth) acrylic resins and combinations thereof, which gives the bests results in terms of adhesion to the substrate, printing definition, quality of markings, rubbing resistance.

More preferably, the binding resin(s) is(are) selected from vinyl acetate/vinyl chloride copolymers—which gives even better results in terms of adhesion to the substrate, printing definition, quality of markings, and rubbing resistance- and (meth) acrylic resins.

Specific examples of these vinyl acetate/vinyl chloride copolymers resins include those sold under the trade name of Vinnol® from Wacker Chemie®. These resins include structurally modified carboxyl-vinyl chloride/vinyl acetate polymers such as Vinnol® E15/45M, hydroxyl-modified vinyl chloride/vinyl acetate copolymers such as Vinnol® E15/40A or unmodified vinyl chloride/vinyl acetate copolymers such as Vinnol® H14/36/Vinnol® H14/36 TF.

A specific example of these (meth) acrylic resins includes ELVACITE® 2008 an acrylic resin available from Lucite International.

More exactly, ELVACITE® 2008 is a low molecular weight methylmethacrylate copolymer.

ELVACITE® 2008 has methacrylic acid incorporated for pigment dispersions.

Advantageously, the binder represents from 0.1 to 50% by weight, preferably from 1% to 45% by weight, still preferably from 5% to 30% by weight, better from 10% to 20% by weight, of the total weight of the ink composition according to the invention.

The ink composition according to the invention is generally a non-aqueous composition, which generally means that the ink composition according to the invention contains a very low proportion of water.

Thus, the ink composition according to the invention usually comprises less than 0.5% by weight of water, preferably less than 0.1% by weight of water and even more preferably less than 0.05% by weight of water in proportion to the total weight of the ink; even better, the solvent, and the ink composition may be considered to essentially contain no water (0% by weight of water).

Since the added water is an impurity in the various components of the ink, the water content will be low when the degree of purity of the components is high. In fact, it could be said that the ink according to the invention does not contain any added water but only water included as an impurity in the different constituents of the ink.

Similarly, the solvent of the ink composition according to the invention is usually non-aqueous in the sense described above, in other words this vehicle is essentially or exclusively organic and only comprises organic solvent compounds.

In the composition according to the invention, the solvent generally represents 20% to 99% by weight of the total weight of the ink composition, preferably the solvent represents from 30% to 95% by weight, more preferably 30% to 90% by weight, even more preferably from 60% to 80% by weight, of the total weight of the ink composition according to the invention.

The solvent comprises, preferably consists of, one or several organic solvent compound(s).

Advantageously, said organic solvent compound(s) comprise(s) a majority weight proportion, based on the total weight of the solvent (50% by weight of the total weight of the solvent or more, or even up to 100% by weight of the total weight of the solvent), of one or several volatile organic solvent compound(s), and a minority weight proportion, based on the total weight of the solvent, of one or several non-volatile organic solvent compound(s).

Preferably, the solvent consists of one or several volatile organic solvent compound(s).

By «volatile organic solvent compound» is generally meant that this compound has a speed of evaporation, evaporation rate, of more than 0.5 (preferably of more than 1.5, more preferably of more than 2) on the scale in which n-butyl acetate has a speed of evaporation equal to 1. In other words (see below), this organic solvent compound has a volatility index according to NF T30-301 standard of more than 0.5, preferably of more than 1.5, more preferably of more than 2.

Said organic solvent compound(s) being part of the solvent is(are) selected, for example from alcohols, in particular low molecular weight alcohols, for example aliphatic alcohols such as ethanol; ketones preferably with a low molecular weight; ethers of alkylene glycols; esters of alkylene glycols and esters of alkylene glycol ethers, such as acetates; dimethyl formamide; N-methyl pyrrolidone; acetals; esters; linear or cyclic ethers; aliphatic, cyclic or linear hydrocarbons; aromatic hydrocarbons; and carbonates such as propylene carbonate, ethylene carbonate and dimethyl- and diethyl-carbonates; and mixtures thereof.

Preferably, this or these solvent compound(s) has(have) the property of dissolving the other ingredients of the ink, notably the binder, the coloring materials, the additives, etc.

The alcohols will preferably be selected from linear or branched aliphatic alcohols with 1 to 8 carbon atoms, such as methanol, ethanol, propanol-1, propanol-2, n-butanol, butanol-2, tert-butanol, etc.

The ketones will preferably be selected from ketones with 3 to 10 carbon atoms, such as acetone, butanone (methyl-ethyl-ketone or MEK), pentanone-2 (methyl-propyl-ketone or MPK), methyl-3 butanone-2 (methyl-isopropyl-ketone) or MiPK, and methyl-4 pentanone-2 (methyl-isobutyl-ketone or MiBK).

The ethers of alkylene glycols are preferably selected from mono-alkyl ethers ($C_1$-$C_6$ alkyl group) or dialkyl ethers ($C_1$-$C_6$ alkyl groups) of alkylene glycol comprising from 1 to 10 carbon atoms in the alkylene chain, preferably these are ethers of ethylene or propylene glycol, such as methoxypropanol.

The esters of alkylene glycols and the esters of alkylene glycol ethers are preferably selected from among the esters of those with saturated aliphatic carboxylic acids with 1 to 6 carbon atoms, such as formic acid, acetic acid, propionic acid, butyric acid, valeric acid and caproic acid.

Mention may for example be made of methoxypropyl acetate, butyldiglycol acetate, etc.

The esters are preferably selected from low molecular mass esters such as formates, acetates, propionates or butyrates of alcohols with 1 to 10 carbon atoms.

The acetals are preferably selected from low molecular mass acetals such as ethylal and methylal.

The ethers are preferably selected from among low molecular mass ethers like dioxolane or tetrahydrofurane.

The man skilled in the art may easily identify from among these solvent compounds those which are volatile and those which are not volatile.

A preferred solvent according to the invention comprises a majority amount by weight (50% or more by weight) based on the total weight of the solvent, preferably consists of, one or several solvent compound(s) selected from ketones with 3 to 10 carbon atoms, such as acetone, butanone (methyl-ethyl-ketone or MEK), pentanone-2 (methyl-propyl-ketone or MPK), methyl-3 butanone-2 (methyl-isopropyl-ketone or MiPK) and methyl-4 pentanone-2 (methyl-isobutyl-ketone or MiBK).

A particularly preferred solvent comprises a majority amount by weight based on the total weight of the solvent, of MEK, preferably consists of MEK.

This preferred solvent may further comprise one or several other solvent compounds, other than the ketone(s) in a total minority amount by weight, based on the total weight of the solvent, for example in an amount from 0.1% to 20% by weight, preferably from 5% to 15% by weight, based on the total weight of the solvent, in order to optimize the properties of the inks. These minority solvents may be selected from esters, ethers of ethylene glycol or of propylene glycol, and from acetals.

Generally, the solvent of the ink composition according to the invention (or more precisely the one or more organic solvent(s) liquid at ambient temperature of said solvent) has a volatility index (Ve) of evaporation index according to NF T30-301 standard (relative to n-butyl acetate) of more than 0.5, preferably of more than 1.5, and more preferably of more than 2.

MEK has a Ve of 3.7 and ethanol has a Ve of 2.

NF T30-301 standard defines the volatility (or evaporation) index of a solvent as follows:

The volatility index (Ve) is the quotient of the evaporation time of n-butyl acetate taken as standard solvent, divided by the evaporation time of the tested solvent, said times being measured under the conditions set out in said NF T30-301 standard.

Thus, $$Ve \text{ (relative to n-butyl acetate)} = \frac{\text{evaporation time of n-butyl acetate}}{\text{evaporation time of the tested solvent}}.$$

The solvent compounds of ink compositions used in the DOD printing technique are generally those with Ve<1.

The ink composition may further comprise one or several plasticizers (of the binding resin(s)) for example selected from plasticizers known to the man skilled in the art and selected according to the binder used comprising one or several binding resin(s).

The plasticizer may be selected from all the plasticizers known to the man skilled in the art. The plasticizer is selected according to the binder used comprising one or several binding resin(s).

Mention may be made, as a plasticizer, for example, of thermoplastic polyurethanes, phthalates, adipates, esters such as citrates like trialkyl citrates, for example tributyl citrate, alkyl phosphates, glycerol, lactic acid, oleic acid, polypropylene glycol, triglycerides of fatty acids, levulinic acid; carbamates or carbamic resins; and mixtures thereof.

By "thermoplastic polyurethanes" are meant polyurethanes from the polycondensation of polyalcohols and of polyisocyanates.

The plasticizer(s) is (are) generally present in an amount of at least 0.05%, preferably 0.1 to 20% by weight, of the total weight of the ink composition.

The composition according to the invention, if it is required to be jettable, sprayable, using the deflected continuous jet printing technique, may also optionally comprise at least one conductivity salt, unless another ingredient of the ink such as a dye, pigment or other is itself an ionisable compound such as a salt that can confer conductivity when it is dissociated, and gives sufficient conductivity to the ink so that there is no need to add another conductivity salt strictly speaking.

When the ink according to the invention has to be applicable by a deflected continuous ink jet, it must have sufficient electrical conductivity, generally greater than or equal to 5 µS/cm at 20° C., preferably greater than or equal to 300 µS/cm at 20° C., even more preferably greater than or equal to 500 µS/cm at 20° C.

The conductivity of the ink composition according to the invention using the deflected continuous jet printing technique (CIJ) could for example be greater than or equal to 300 µS/cm at 20° C., particularly from 500 to 2000 µS/cm at 20° C.

Let us specify that the electric conductivity is measured with a commercial instrument and according to the principle well-known to the man skilled in the art, for example described on the site: http://frwikipedia.org/wiki/Conductim%C3%A9trie.

The electric conductivity may be measured according to the following standard:

ASTM D1125-14: Standard Test Methods for Electrical Conductivity and Resistivity of Water.

The electric conductivity may be measured for example with a commercially available conductimeter of the Radiometer® Company.

However, it will sometimes be necessary to include at least one conductivity salt strictly speaking into the ink composition, different from ionisable compounds, such as the dyes, pigments and other ingredients mentioned above.

A "conductivity salt" generally means a salt that confers electrical conductivity to the ink composition.

This conductivity salt may thus be chosen from among alkaline metals salts such as lithium, sodium, potassium salts, alkaline earth metal salts such as magnesium and calcium salts, and single or quaternary ammonium salts; these salts being in the form of halides (chlorides, bromides, iodides, fluorides), perchlorates, nitrates, thiocyanates, formiates, acetates, sulphates, propionates, trifluoroacetates, triflates (trifluoromethane sulphonates), hexafluorophosphates, hexafluoroantimonates, tetrafluoroborates, picrates, carboxylates or sulphonates, etc.

Since, generally, the markings obtained with the ink composition usually have to be resistant to water, this or these conductivity salts will preferably be chosen from among those that are insoluble in water (in other words, in general, for which the solubility in water is less than 0.5% by weight), such as fatty chain quaternary ammonium and hexafluorophosphates or hexafluoroantimonates.

Therefore, this at least one conductivity salt will be present if necessary in the ink composition so as to confer the above conductivity to the ink: preferably, its (their) amount will be from 0.1 to 20% by weight, more preferably from 0.1 to 10% by weight and even better from 0.1 to 5% by weight, of the total weight of the ink composition.

The composition according to the invention may also comprise one or several additives, for example chosen from among the compounds that improve the solubility of some of its components, the print quality, the adherence, or the control of wetting of the ink on different supports.

The additive(s) may be chosen for example from among anti-foaming agents; chemical stabilisers; UV stabilisers; surface active agents such as Fluorad® FC430 or BYK UV-3500 or polyether modified polysiloxanes; agents inhibiting corrosion by salts, particularly by conductivity salts; bactericides, fungicides and biocides; and pH regulatory buffers, etc.

The additive(s) is (are) used at very low doses, usually less than or equal to 5% and sometimes as low as 0.01%, depending on whether they are anti-foaming agents, stabilisers or surface-active agents.

The viscosity of the ink jet ink composition according to the invention is generally from 1 to 20 cPs (mPa·s), preferably from 1 to 15 cPs (mPa·s), more preferably from 4 to 10 cPs (mPa·s) at 20° C.

The viscosity may be measured according to the following standard:

DIN 53019-1: Measurements of viscosities and flow curves by means of rotational viscometers.

The dynamic viscosities may be measured for example by means of a viscometer with coaxial cylinders, such as the viscometer with coaxial cylinders of the "Couette" type of the Contraves® Company.

Another object of the invention is a method for marking a substrate, support or object, article, for example, porous or non-porous, by spraying, jetting, an ink composition onto this substrate, support or object using an ink jet printing technique, the sprayed ink composition being an opaque grey ink jet ink composition according to the invention as described above.

Marking may be made using the continuous deflected ink jet printing technique or the drop on demand ink jet printing technique. The continuous deflected ink jet printing technique also includes the continuous deflected ink jet printing technique, with uncharged drops called the "SPI" technique.

Another object of the invention is a substrate, support or object, for example porous or non-porous provided with a marking obtained by drying and/or absorption (in the substrate or support) of the ink composition as described above.

Said marking comprises essentially the dye or pigment of the ink and the binder and is obtained by evaporation and/or absorption in the substrate, of essentially all other constituents of the ink such as the solvent.

The substrate is whatever substrates on which one can print using an ink jet printing technique such as the CIJ printing technique.

This substrate may be made of metal, for example of iron, aluminium, or steel especially stainless steel (cans such as beverage cans); of glass (glass bottles); of ceramic; of a material containing cellulose such as cellophane, paper, possibly coated or glazed, cardboard or wood; of an organic polymer, particularly a thermoplastic polymer (plastic), particularly in the form of a film, for example chosen from among PVDCs, PVCs, polyesters, PETs, polyolefins, such as polyethylenes (PE) or polypropylenes (PP); of poly(methyl methacrylate) PMMA also called "Plexiglas"; of fabric; of natural or synthetic rubber; or of any other non-porous or porous substance; or of a composite of several of the above materials.

The substrate may be an extruded, moulded, blow-moulded, injection-moulded, or rotation-moulded part made of one or more organic polymer(s), in particular made of one or more thermoplastic polymer(s), preferably selected from polyvinylchlorides (PVCs), and polyolefins, such as polyethylenes (PEs) or polypropylenes (PPs); or made of rubber.

Said part may, for example, be selected from wires, cables, hoses, pipes, cable ducts, cable trays, and boxes, coatings and housings of all kinds such as electrical boxes and cable boxes.

Surfaces having different colours, whatever said colours, present on the same substrate such as a wire or cable can be marked with a one and single ink jet composition according to the invention.

Several substrates, each having a different colour, can also be marked with a one and single ink jet composition according to the invention.

This results in huge costs and time savings.

The substrate may have any shape.

An excellent quality of markings, printings can be obtained on all substrates, particularly on wires, cables, hoses, pipes, cable ducts, cable trays, and boxes, coatings and housings of all kinds such as electrical boxes and cable boxes.

The invention will be better understood upon reading the following description of particular embodiments of the invention, given as illustrative and non-limiting examples, in relation with the appended drawings.

DETAILED DESCRIPTION OF PARTICULAR EMBODIMENTS

Examples (Part I)

Figure 1:
FIG. 1 is a photograph of a printed message obtained by jetting Ink composition 3 according to the invention, using a Markem-Imaje® printer 9040C (which uses the continuous deflected ink jet printing technique), on a white PE cable and on a black PE cable.

In examples 1 to 7, opaque, grey, ink jet ink compositions according to the invention are prepared. These ink jet ink compositions according to the invention contain a black pigment In comparative examples 1 and 2, opaque, grey, ink compositions not according to the inventions are prepared.

These ink compositions comprise, the ingredients, constituents, mentioned in Table I below, in the proportions mentioned in Table I below.

These compositions are generally prepared by simply mixing the ingredients.

The binder percentages are given as wt. % solid.

The Viscosity at 20° C. (mPa·s/cPs), the conductivity at 20° C. (µS/cm), and ΔL*n and ΔL*b have also been specified in Table I.

ΔL*n is the colour difference between L*n, i.e. L* of the dried ink coated on a black strip of an opacity chart, and L*ref, i.e. L* (average) of the black strip (i.e. black background) of the opacity chart.

ΔL*b is the colour difference between L*b, i.e. L* of the dried ink coated on a white strip of an opacity chart, and L*ref, i.e. L* (average) of the white strip (i.e. white background) of the opacity chart.

TABLE 1

| Constituents (wt. %) | Not according to the invention | | According to the invention | | | | | | |
|---|---|---|---|---|---|---|---|---|---|
| | Comparative Example 1 | Comparative Example 2 | Example 1 (limit) | Example 2 (limit) | Example 3 | Example 4 | Example 5 | Example 6 | Example 7 |
| MEK | 72.854 | 58.4 | 72.708 | 65.7 | 72.416 | 72.27 | 72.124 | 71.686 | 71.8 |
| Vinnol ® E15/40A | 5.988 | 4.8 | 5.976 | 5.4 | 5.952 | 5.94 | 5.928 | 5.892 | 5.9 |
| Elvacite ® 2008 | 4.99 | 4 | 4.98 | 4.5 | 4.96 | 4.95 | 4.94 | 4.91 | 4.9 |
| White pigment dispersion | 14.97 | 12 | 14.94 | 13.5 | 14.88 | 14.85 | 14.82 | 14.73 | 14.8 |
| $KPF_6$ Potassium Hexafluorophosphate | 0.7984 | 0.64 | 0.7968 | 0.72 | 0.7936 | 0.792 | 0.7904 | 0.7856 | 0.8 |
| BYK-UV 3500 ® | 0.1996 | 0.16 | 0.1992 | 0.18 | 0.1984 | 0.198 | 0.1976 | 0.1964 | 0.1968 |
| Black pigment dispersion | 0.2 | 20 | 0.4 | 10 | 0.8 | 1 | 1.2 | 1.8 | 1.2 |
| Yellow pigment dispersion | 0 | 0 | 0 | 0 | 0 | 0 | 0 | 0 | 0.4 |
| Total wt. % | 100 | 100 | 100 | 100 | 100 | 100 | 100 | 100 | 100 |
| ΔL * n | 51 | 4 | 47.5 | 12 | 44 | 42 | 38 | 34 | 38 |
| ΔL * b | 12 | 88 | 20 | 79 | 32 | 35.5 | 42 | 47 | 42 |
| Conductivity (MS/cm at 20° C.) | 1142 | 1175 | 1145 | 1161 | 1147 | 1149 | 1151 | 1155 | 1130.00 |
| Viscosity (mPa · s – 1/20° C.) | 4.7 | 4.95 | 4.71 | 4.86 | 4.75 | 4.76 | 4.79 | 4.8 | 4.8 |
| Wt. % white pigment | 9.7305 | 7.8 | 9.711 | 8.775 | 9.672 | 9.6525 | 9.633 | 9.5745 | 9.594 |
| Wt. % black pigment | 0.051 | 5.1 | 0.102 | 2.55 | 0.204 | 0.255 | 0.306 | 0.459 | 0.306 |
| Wt. % yellow pigment | 0 | 0 | 0 | 0 | 0 | 0 | 0 | 0 | 0.1 |

The white pigment dispersion is a dispersion in MEK, containing 65 wt. % Pigment White 6 ($TiO_2$, Rutile form) available from the Kronos® Company under the denomination "Kronos® 2064".

The black pigment dispersion is a dispersion in MEK, containing 25.5 wt. % Carbon Black.

The yellow pigment dispersion is a dispersion in MEK, containing 25 wt. % Pigment Yellow 83.

ELVACITE® 2008 is an acrylic resin available from Lucite International.

More exactly, ELVACITE® 2008 is a low molecular weight methylmethacrylate copolymer.

ELVACITE® 2008 has methacrylic acid incorporated for pigment dispersions.

VINNOL® E15/40A is a hydroxyl-containing copolymer of approx. 84 wt % vinyl chloride (VC) and approx. 16 wt. % of acrylic acid esters, available from Wacker Chemie AG.

BYK-UV 3500® is a crosslinking, silicone-containing surface additive, namely a Polyether-modified, acryl-functional polydimethylsiloxane, available from the BYK company.

Let us specify that the weight percentages of the pigment dispersions specified in the above Table I, are expressed as a weight percentage of the liquid dispersions on the total weight of the ink composition.

The dynamic viscosities were measured at 20° C., by means of a viscometer with coaxial cylinders, namely the "low shear 30" from the Contraves® Company at a shearing rate of 60 $s^{-1}$.

The electric conductivities were measured at 20° C. with a commercially available conductimeter of the Radiometer® Company.

The ink compositions recited in Table I above were coated on opacity charts and allowed to dry in air at room temperature.

Said opacity charts were opacity charts Leneta Form 2A from Labomat®.

Leneta Form 2A are black and white sealed opacity charts. The top is black and the bottom is white with overall dimensions of 5½×10 inches (140×254 mm).

The handcoater is a K Control Coater from RK Printcoat Instruments.

The coating conditions were as follows:
N° 2 Bar.
Speed 6.

The coated thickness is very precisely defined by the specific bar used for coating, namely the N° 2 bar.

L*, a*, and b* of the dried coated ink compositions were measured in CIELAB coordinates, CIELAB color space (also known as CIE L*a*b*) by means of an eXact® spectrophotometer of the X-rite Pantone® company using the following measurement conditions:
Illuminent D65;
Viewing angle: 10°;
Polarizing filter: M3;
Measurements:
  Three L*, a*, and b* measurements on the white area of the opacity chart (left-middle-right);
  Three L*, a*, and b* measurements on the black area of the opacity chart (left-middle-right).
L* is the lightness from black (0) to white (100).
L*b is the averaged value of the three L*, a*, and b* measurements on the white area of the opacity chart.
L*n is the averaged value of the three L*, a*, and b* measurements on the black area of the opacity chart.

L*ref, i.e. L* (average) of the black strip (i.e. black background) of the opacity chart, and L*ref, i.e. L* (average) of the white strip (i.e. white background) of the opacity chart, were also measured.

L*ref, i.e. L* (average) of the black strip (i.e. black background) of the opacity chart was 1.71 with a standard deviation of 0.39, and L*ref, i.e. L* (average) of the white strip (i.e. white background) of the opacity chart was 93.24 with a standard deviation of 0.08.

$\Delta L\_*n$ and $\Delta L\_*b$ were then calculated.

$\Delta L*n=L*n-L*ref$, i.e. L* (average) of the black strip of the opacity chart.

$\Delta L*b=L*b-L*ref$, i.e. L* (average) of the white strip of the opacity chart.

$\Delta L\_*n$ and $\Delta L\_*b$ of the dried coated ink compositions according to the invention of examples 1 to 7 clearly show that all said inventive ink compositions give grey marking having high contrast both on white surfaces and black surfaces and are therefore easily legible, visible, on both substrates.

$\Delta L\_*n$ and $\Delta L\_*b$ are corresponding to contrast (i.e. contrast between the marking consisting of the dried coated ink composition and the support, background) measurements. The higher the values of $\Delta L\_*n$ and $\Delta L*b$ the more the marking is visible.

When $\Delta L\_*n$ and $\Delta L\_*b$ are close to each other, visibility of the marking is optimal both on the white background and on the black background.

The optimal values of $\Delta L\_*n$ and $\Delta L\_*b$ (examples wherein visibility, legibility of the marking is the best) are both close to 40.

Contrast, legibility, visibility, of the dried coated ink compositions prepared as above on opacity charts, were assessed with the naked eyes by several observers, namely a panel of four observers.

Contrast, legibility, visibility, of the ink compositions according to the invention (Examples 1 to 7) proved to be good: See Table II below.

Ink compositions 3, 5 and 6 according to the invention were also jetted, using a Markem-Imaje® printer 9040C, which uses the continuous deflected ink jet printing technique (but other printers may be used), on black PE cables, and on white PE cables.

Figure 2:
FIG. 2 is a photograph of a printed message obtained by jetting Ink composition 5 according to the invention, using a Markem-Imaje® printer 9040C (which uses the continuous deflected ink jet printing technique), on a black PE cable and on a white PE cable.
Figure 3:
FIG. 3 is a photograph of a printed message obtained by jetting Ink composition 6 according to the invention, using a Markem-Imaje® printer 9040C (which uses the continuous deflected ink jet printing technique), on a black PE cable and on a white PE cable.

FIGS. 1, 2 and 3, clearly show that all the printed messages, markings, have a good contrast, a high printing quality, are legible, and visible, both on black PE cables, and on white PE cables.

More precisely, the printing quality is high and the markings visually appear as distinct, well separated, round dots (or droplets), which do not merge with each other and the printed message is clear, easily legible, visible and has a good contrast In other words, the marking dots exhibit a high definition and do not smear or smudge.

Ink compositions 3, 4, 5 and 6 according to the invention were also jetted using a Markem-Imaje® printer 9040C, which uses the continuous deflected ink jet printing technique (but other printers may be used), on colored substrates.

Said colored substrates are blue, red, yellow, orange, and green PE cables.

Colour photographs of the printed messages, markings were taken. All printed messages, markings, have a good contrast, a high printing quality, are legible, and visible, whatever the colour of the substrate.

More precisely, the printing quality is high and the markings visually appear as distinct, well separated, round dots (or droplets), which do not merge with each other and the printed message is clear, easily legible, visible and has a good contrast, whatever the colour of the substrate.

TABLE 11

|  | Comparative Example 1 | Comparative Example 2 | Example 1 (limit) | Example 2 (limit) | Example 3 | Example 4 | Example 5 | Example 6 | Example 7 |
|---|---|---|---|---|---|---|---|---|---|
| Visibility on black background- Observer 1 | good | hardly visible | good | visible | good | good | good | good | good |
| Visibility on black background- Observer 2 | good | not visible | good | visible | good | good | good | good | good |
| Visibility on black background- Observer 3 | good | not visible | good | visible | good | good | good | good | good |
| Visibility on black background- Observer 4 | good | not visible | good | visible | good | good | good | good | good |
| Visibility on white background- Observer 1 | hardly visible | good | visible | good | good | good | good | good | good |
| Visibility on white background- Observer 2 | not visible | good | visible | good | good | good | good | good | good |
| Visibility on white background- Observer 3 | not visible | good | visible | good | good | good | good | good | good |
| Visibility on white background- Observer 4 | hardly visible | good | hardly visible | good | good | good | good | good | good |

Accordingly, the ink compositions according to the invention which give printed messages, markings having good contrast, good legibility, both on black surfaces and on white surfaces, i.e. the two extremes on the colorimetric scale, will also obviously have good contrast, good legibility on all surfaces having colours intermediate between these two extremes such as dark coloured surfaces and light coloured surfaces.

In other words, the marking dots exhibit a high definition and do not smear or smudge, whatever the colour of the substrate.

Moreover, various tests were carried out, and clearly demonstrate that the ink compositions according to the invention (when jetted using a Markem-Imaje® printer 9040C, which uses the continuous deflected ink jet printing technique), such as the ink compositions of Table I, provide, especially on PE and PVC cables, markings that resist to friction, rubbing with a finger and with a gum, and are not damaged or erased.

Tests have also shown that markings obtained with the ink compositions according to the invention (when jetted using a Markem-Imaje® printer 9040C, which uses the continuous deflected ink jet printing technique) do not transfer (cables against cables with pressure and temperature being applied).

The markings obtained with the ink composition according to the invention also give good results when subjected to the "Scotch Tape" test.

Tests were also carried out clearly showing that the markings obtained with the opaque grey ink jet ink compositions according to the invention are also highly resistant to water, ethanol, isopropanol, and gasoline and to rubbing with said substances.

Other tests have been carried out and have actually demonstrated that the opaque grey ink jet ink compositions according to the invention have a high lightfastness.

Finally, tests have been carried out, and have actually demonstrated that all the above properties (resistance to friction, rubbing, non-transfer, resistance to solvents, lightfastness . . . ) of the ink compositions according to the invention such as the inks of examples 1 to 7 of Table I, containing only pigments as coloring agents and no dye, are In Reference Example 1, a reference ink composition is prepared. This reference ink composition does not comprise any black pigment or dye and only comprise a white pigment.

In comparative examples 1' and 2', opaque, grey, ink compositions not according to the inventions are prepared.

These ink compositions comprise, the ingredients, constituents, mentioned in Table III below, in the proportions mentioned in Table III below.

These compositions are generally prepared by simply mixing the ingredients.

The binder percentages are given as wt. % solid.

The Viscosity at 20° C. (mPa·s/cPs), the conductivity at 20° C. (μS/cm), and ΔL*n and ΔL_*b have also been specified in Table I.

ΔL*n is the colour difference between L*n, i.e. L* of the dried ink coated on a black strip of an opacity chart, and L*ref, i.e. L* (average) of the black strip (i.e. black background) of the opacity chart.

ΔL*b is the colour difference between L*b, i.e. L* of the dried ink coated on a white strip of an opacity chart, and L*ref, i.e. L* (average) of the white strip (i.e. white background) of the opacity chart.

TABLE III

| Constituents (wt. %) | Not according to the invention | | | According to the invention | | | | |
|---|---|---|---|---|---|---|---|---|
| | Reference Example | Comparative Example 1' | Comparative Example 2' | Example 1' (limit) | Example 2' (limit) | Example 3' | Example 4' | Example 5' |
| MEK | 73.0 | 72.982 | 65.700 | 72.964 | 66.795 | 72.927 | 71.175 | 69.715 |
| Vinnol ® E15/40A | 6.0 | 5.999 | 5.400 | 5.997 | 5.490 | 5.994 | 5.850 | 5.730 |
| ELVACITE ® 2008 | 5.0 | 4.999 | 4.500 | 4.998 | 4.575 | 4.995 | 4.875 | 4.775 |
| White pigment dispersion | 15.0 | 14.996 | 13.500 | 14.993 | 13.725 | 14.985 | 14.625 | 14.325 |
| (Salt) KPF$_6$ Potassium Hexafluoro-phosphate | 0.8 | 0.800 | 0.720 | 0.800 | 0.732 | 0.799 | 0.780 | 0.764 |
| BYK-UV 3500 ® | 0.2 | 0.200 | 0.180 | 0.200 | 0.183 | 0.200 | 0.195 | 0.191 |
| Black Dye | 0.0 | 0.025 | 10.0 | 0.05 | 8.5 | 0.1 | 2.5 | 4.5 |
| Yellow pigment dispersion | 0.0 | 0 | 0 | 0 | 0 | 0.0 | 0.0 | 0.0 |
| Total wt.% | 100.0 | 100.0 | 100.0 | 100.0 | 100.0 | 100.0 | 100.0 | 100.0 |
| ΔL * n | 55 | 51 | 1 | 50.5 | 2 | 47 | 17 | 6.5 |
| ΔL * b | 0 | 4 | 91 | 7 | 92 | 12 | 72 | 84 |
| Conductivity (μS/cm at 20° C.) | 1139 | 1138 | 1653 | 1140 | 1601 | 1154 | 1365 | 1463 |
| Viscosity (mPa · s$^{-1}$/ 20° C.) | 4.66 | 4.68 | 8.02 | 4.71 | 7.52 | 4.76 | 5.78 | 6.37 |
| Wt. % white pigment | 9.75 | 9.747 | 8.775 | 9.745 | 8.921 | 9.74 | 9.506 | 9.311 |
| Wt. % black dye | 0 | 0.025 | 10.0 | 0.05 | 8.5 | 0.1 | 2.5 | 4.5 |
| Wt. % yellow pigment | 0 | 0 | 0 | 0 | 0 | 0 | 0 | 0 |
| Ratio Black Dye/ White pigment | 0 | 0.002565 | 1.1396 | 0.00513 | 0.9528 | 0.0102 | 0.263 | 0.483 | far better than the properties of ink compositions containing a white pigment and a black dye. In particular, non-transfer and lightfastness of the ink compositions according to the invention are significantly improved when compared to non-transfer and lightfastness of ink compositions containing a white pigment and a black dye.

Examples (Part II)

In examples 1' to 5', opaque, grey, ink jet ink compositions according to the invention are prepared. These ink jet ink compositions according to the invention contain a black dye.

The white pigment dispersion is a dispersion in MEK, containing 65 wt. % Pigment White 6 (TiO$_2$, Rutile form) available from the Kronos® Company under the denomination "Kronos® 2064".

The black dye is Solvent Black 27. This black dye is in the form of a powder (100% solid) available from Orient Chemical Industries Co. Ltd under the denomination VALIFAST® Black 3830.

The yellow pigment dispersion is a dispersion in MEK, containing 25 wt. % Pigment Yellow 83.

ELVACITE® 2008 is an acrylic resin available from Lucite International.

More exactly, ELVACITE® 2008 is a low molecular weight methylmethacrylate copolymer.

ELVACITE® 2008 has methacrylic acid incorporated for pigment dispersions.

VINNOL® E15/40A is a hydroxyl-containing copolymer of approx. 84 wt. % vinyl chloride (VC) and approx. 16 wt. % of acrylic acid esters, available from Wacker Chemie AG.

BYK-UV 3500® is a crosslinking, silicone-containing surface additive, namely a Polyether-modified, acryl-functional polydimethylsiloxane, available from the BYK company.

Let us specify that the weight percentages of the pigment dispersions specified in the above Table III, are expressed as a weight percentage of the liquid dispersions on the total weight of the ink composition.

The dynamic viscosities were measured at 20° C., by means of a viscometer with coaxial cylinders, namely the "low shear 30" from the Contraves® Company at a shearing rate of 60 $s^{-1}$.

The electric conductivities were measured at 20° C. with a commercially available conductimeter of the Radiometer® Company.

The ink compositions recited in Table III above were coated on opacity charts and allowed to dry in air at room temperature.

Said opacity charts were opacity charts Leneta Form 2A from Labomat®.

Leneta Form 2A are black and white sealed opacity charts. The top is black and the bottom is white with overall dimensions of 5½×10 inches (140×254 mm).

The handcoater is a K Control Coater from RK Printcoat Instruments.

The coating conditions were as follows:
N° 2 Bar.
Speed 6.

The coated thickness is very precisely defined by the specific bar used for coating, namely the N° 2 bar.

$L^*$, $a^*$, and $b^*$ of the dried coated ink compositions were measured in CIELAB coordinates, CIELAB color space (also known as CIE $L^*a^*b^*$) by means of an eXact® spectrophotometer of the X-rite Pantone® company using the following measurement conditions:
Illuminent D65;
Viewing angle: 10°;
Polarizing filter: M3;

Measurements:
Three $L^*$, $a^*$, and $b^*$ measurements on the white area of the opacity chart (left-middle-right);
Three $L^*$, $a^*$, and $b^*$ measurements on the black area of the opacity chart (left-middle-right).

$L^*$ is the lightness from black (0) to white (100).

$L^*b$ is the averaged value of the three $L^*$, $a^*$, and $b^*$ measurements on the white area of the opacity chart.

$L^*n$ is the averaged value of the three $L^*$, $a^*$, and $b^*$ measurements on the black area of the opacity chart.

$L^*ref$, i.e. $L^*$ (average) of the black strip (i.e. black background) of the opacity chart, and $L^*ref$, i.e. $L^*$ (average) of the white strip (i.e. white background) of the opacity chart, were also measured.

$L^*ref$, i.e. $L^*$ (average) of the black strip (i.e. black background) of the opacity chart was 1.71 with a standard deviation of 0.39, and $L^*ref$, i.e. $L^*$ (average) of the white strip (i.e. white background) of the opacity chart was 93.24 with a standard deviation of 0.08.

$\Delta L\_^*n$ and $\Delta L\_^*b$ were then calculated.

$\Delta L^*n = L^*n - L^*ref$, i.e. $L^*$ (average) of the black strip of the opacity chart.

$\Delta L^*b = L^*b - L^*ref$, i.e. $L^*$ (average) of the white strip of the opacity chart.

$\Delta L\_^*n$ and $\Delta L\_^*b$ of the dried coated ink compositions according to the invention of examples 1' to 5' clearly show that all said inventive ink compositions give grey marking having high contrast both on white surfaces and black surfaces and are therefore easily legible, visible, on both substrates.

$\Delta L^*n$ and $\Delta L^*b$ are corresponding to contrast (i.e. contrast between the marking consisting of the dried coated ink composition and the support, background) measurements. The higher the values of $\Delta L^*n$ and $\Delta L^*b$ the more the marking is visible.

When $\Delta L^*n$ and $\Delta L^*b$ are close to each other, visibility of the marking is optimal both on the white background and on the black background.

The optimal values of $\Delta L^*n$ and $\Delta L^*b$ (examples wherein visibility, legibility of the marking is the best) are both close to 40.

Contrast, legibility, visibility, of the dried coated ink compositions prepared as above on opacity charts, were assessed with the naked eyes by several observers, namely a panel of four observers.

Contrast, legibility, visibility, of the ink compositions according to the invention (Examples 1' to 5') proved to be good: See Table IV below.

|  | Comparative Example 1' | Comparative Example 2' | Example 1' (limit) | Example 2' (limit) | Example 3' | Example 5' |
|---|---|---|---|---|---|---|
| Colour of the ink dot on Black Background |  | Black |  | Anthracite grey |  | Grey |
| Visibility on black background- Observer 1 |  | Not visible |  | Visible |  | Visible |
| Visibility on black background- Observer 2 |  | Not visible |  | Visible |  | Visible |
| Visibility on black background- Observer 3 |  | Not visible |  | Visible |  | Visible |
| Visibility on black background- Observer 4 |  | Not visible |  | Visible |  | Visible |
| Colour of the ink dot on white background | White |  | Grey |  | Grey |  |

-continued

|  | Comparative Example 1' | Comparative Example 2' | Example 1' (limit) | Example 2' (limit) | Example 3' | Example 5' |
|---|---|---|---|---|---|---|
| Visibility on white background- Observer 1 | Not visible |  | visible |  | visible |  |
| Visibility on white background- Observer 2 | Not visible |  | visible |  | visible |  |
| Visibility on white background- Observer 3 | Not visible |  | visible |  | visible |  |
| Visibility on white background- Observer 4 | Not visible |  |  | Not visible | visible |  |
| Visibility on white background- Observer 5 | Not visible |  |  | Not visible | visible |  |

Accordingly, the ink compositions according to the invention, containing a black pigment or a black dye as well, which give printed messages, markings having good contrast, good legibility, both on black surfaces and on white surfaces, i.e. the two extremes on the colorimetric scale, will also obviously have good contrast, good legibility on all surfaces having colours intermediate between these two extremes such as dark coloured surfaces and light coloured surfaces.

What is claimed is:

1. Opaque grey ink jet ink composition, liquid at room temperature, comprising:
   a) a solvent comprising one or more organic solvent compound(s);
   b) a binder, comprising one or more binding resin(s);
   wherein the ink jet ink composition further comprises:
   c) one or more black pigment(s) and/or one or more black dye(s);
   d) one or more white pigment(s);
      wherein the one or more black pigment(s) and/or the one or more black dye(s) c) is (are) present in a total amount from 0.01% to 8.5% by weight of the total weight of the ink jet ink composition;
      wherein the one or more white pigment(s) is (are) present in a total amount from 0.5% to 30% by weight of the total weight of the ink jet ink composition;
      wherein the ratio: amount by weight of the one or more black pigment(s) and/or the one or more black dye(s)/amount by weight of the one or more white pigment(s) is from 0.001 to 1; and
      wherein the opaque grey ink jet ink composition has a viscosity of 1 to 20 cPs at 20 degrees Centigrade.

2. Opaque grey ink jet ink composition according to claim 1 comprising one or more black pigments and no black dyes, wherein said black pigment(s) is (are) present in a total amount from 0.08% to 4.5% by weight of the total weight of the ink jet ink composition; and wherein the ratio: amount by weight of the one or more black pigment(s)/amount by weight of the one or more white pigment(s) is from 0.001 to 0.3.

3. Opaque grey ink jet ink composition according to claim 1 comprising one or more black dye(s) and no black pigments, wherein said black dye(s) is (are) present in a total amount from from 0.05% to 4.5% by weight, of the total weight of the ink jet ink composition; and wherein the ratio: amount by weight of the one or more black dye(s)/amount by weight of the one or more white pigment(s) is from 0.02 to 0.05.

4. Opaque grey ink jet ink composition according to claim 1, wherein the black pigment(s) is (are) selected from C.I. (Colour Index) Pigment Blacks, such as C.I. Pigment Black 6 (carbon black), and C.I. Pigment Black 7 (carbon black), and the black dye(s) are selected among C.I. Solvent Black 27, C.I. Solvent Black 29, C.I. Solvent Black 35, and C.I. Solvent Black 45.

5. Opaque grey ink jet ink composition according to claim 1, wherein the white pigment(s) is (are) selected from C.I. Pigment White 5 (Lithopone, mixture of barium sulphate and zinc sulphide), 6 ($TiO_2$), 12 ($ZrO_2$), and 21 ($BaSO_4$).

6. Opaque grey ink jet ink composition according to claim 1, further comprising one or more dye(s) and/or one or more pigment(s) having a colour other than white and other than black.

7. Opaque grey ink jet ink composition according to claim 6, wherein the one or more dye(s) and/or the one or more pigment(s) having a colour other than white and other than black is (are) present in a total amount from 0.01 to 1.5%, by weight of the total weight of the ink jet ink composition.

8. Opaque grey ink jet ink composition according to claim 6, wherein the one or more dye(s) having a colour other than white and other than black is (are) selected from among Colour Index (C.I.) solvent dyes, and the one or more pigment(s) having a colour other than white and other than black is (are) selected from among Colour Index (C.I.) pigments.

9. Opaque grey ink jet ink composition according to claim 1, wherein the binding resin(s) is (are) selected from (meth) acrylic, vinylic, ketonic, hydroxyaromatic, for example phenolic, cellulosic, styrenic, epoxy, polyurethane, styrene-acrylate, alkoxysilane, ester resins, and combinations thereof.

10. Opaque grey ink jet ink composition according to claim 1, wherein the binder represents from 0.1 to 50% by weight, of the total weight of the ink composition.

11. Opaque grey ink jet ink composition according to claim 1, in which the solvent represents from 20 to 99% by weight of the total weight of the ink composition.

12. Opaque grey ink jet ink composition according to claim 1, in which said organic solvent compound(s) of the solvent is (are) selected from among alcohols; ketones; alkylene glycols ethers; alkylene glycols esters and esters of alkylene glycols ethers; dimethyl formamide; N-methyl pyrrolidone; acetals; esters; linear or cyclic ethers; aliphatic, cyclic or linear hydrocarbons; aromatic hydrocarbons; and carbonates; and mixtures thereof.

13. Opaque grey ink jet ink composition according to claim 1, in which the solvent comprises 50% or more by weight relative to the total weight of the solvent, of one or several solvent compound(s) selected from ketones with 3 to 10 carbon atoms.

14. Opaque grey ink jet ink composition according to claim 1, further comprising at least one conductivity salt, with a content of 0.1 to 20%.

15. Opaque grey ink jet ink composition according to claim 1, that has a conductivity in the liquid state greater than or equal to 5 µS/cm at 20° C.

16. Method for marking a substrate, support or object by spraying an ink composition onto this substrate, support or object using an ink jet printing technique, wherein the sprayed ink composition is an opaque grey ink jet ink composition according to claim 1.

17. Substrate, support or object wherein it is provided with a marking obtained by drying and/or absorption of the opaque grey ink jet ink composition according to claim 1.

18. Substrate, support or object according to claim 17, which is an extruded, moulded, blow-moulded, injection-moulded, or rotation-moulded part made of one or more organic polymer(s), selected from polyvinylchlorides (PVCs), polyolefins, and made of rubber.

19. Substrate, support or object according to claim 18, wherein said part is selected from wires, cables, hoses, pipes, cable ducts, cable trays, and boxes, coatings and housings.

* * * * *